July 6, 1926.

E. A. BIENENSTOK

GREASE DISTRIBUTOR

Filed Oct. 31, 1921

1,591,604

Inventor
Edgar A. Bienenstok

Patented July 6, 1926.

1,591,604

UNITED STATES PATENT OFFICE.

EDGAR A. BIENENSTOK, OF MILWAUKEE, WISCONSIN, ASSIGNOR TO MILWAUKEE TANK WORKS, OF MILWAUKEE, WISCONSIN, A CORPORATION OF WISCONSIN.

GREASE DISTRIBUTOR.

Application filed October 31, 1921. Serial No. 511,605.

This invention relates to an attachment of the grease gun type adapted to be used with receptacles containing grease to dispense the grease therefrom to any desired place for use. Grease is put up by the manufacturer or distributor, ordinarily, in pails of certain sizes and capacities, and theretofore it has been a custom to either take the grease direct from the pail by means of a paddle or the like and carry it to the place where it is to be used; or the grease has been removed from the receptacle and placed in another receptacle equipped with grease dispensing means; while in some instances, a grease gun is inserted at its open end in the grease within the pail or receptacle as delivered by the manufacturer or distributor, the gun being filled direct therefrom, after which it is taken to the place of use. All of these methods, however, are more or less unsatisfactory, particularly by reason of the trouble and uncleanliness attendant upon handling the grease by any of such methods. My invention has for its primary object and purpose the provision of a very simple device which may be used direct with the receptacle containing the grease as it is distributed to the user of the same, being particularly effective for removing all the grease from the receptacle without danger or likelihood of any personal contact therewith.

Other objects of my invention are especial simplicity and strength of construction, ease of operation, the operator merely turns a crank to imply force, continuousness of operation, a steady flow of fluid being supplied and definite regulation of the flow of fluid. Provision is made for measuring the quantity of fluid discharged.

Reference is had to the accompanying drawings, in which:—

Figure 1:
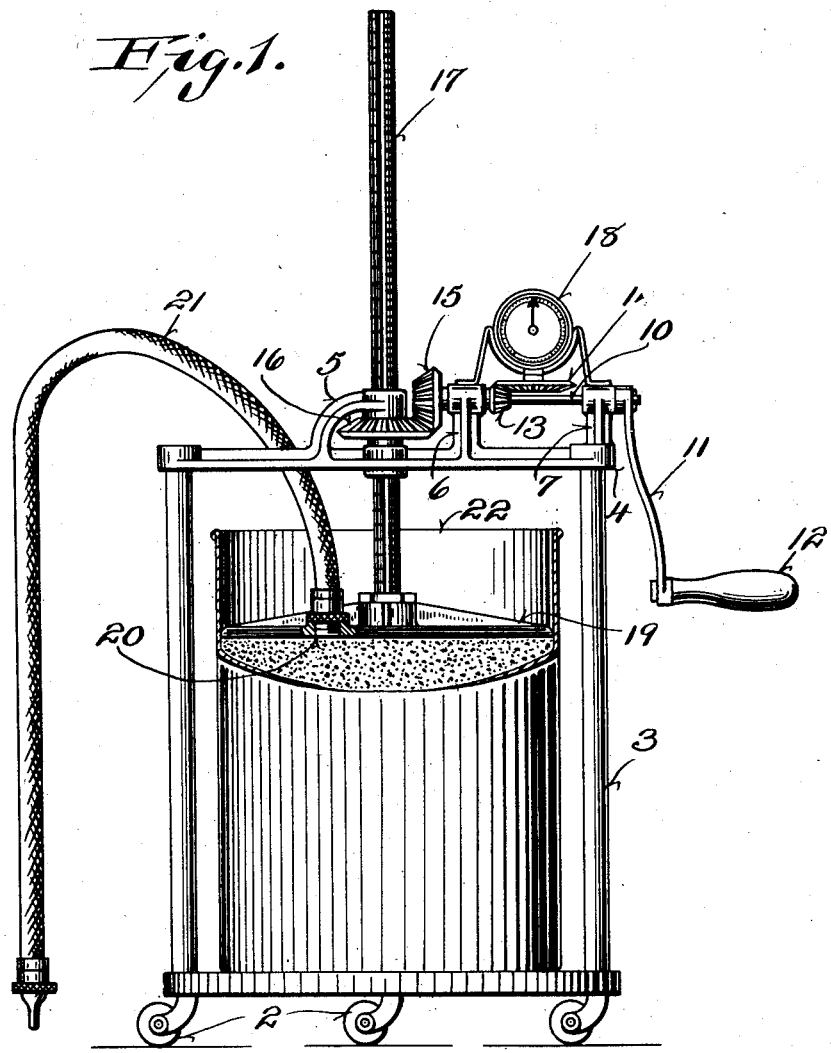
Figure 1 shows a side elevation of my device.
Figure 2:
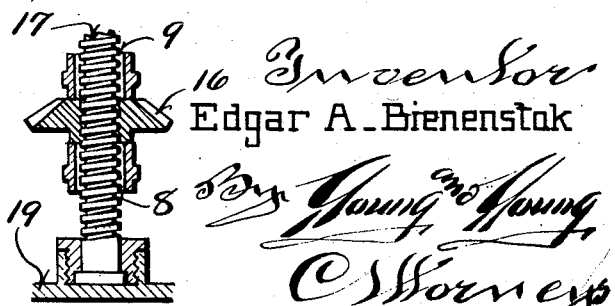
Figure 2 shows a vertical central section thru the gear and plunger shaft.

My invention comprises a portable device adapted to receive a pail of standard dimensions. The portable device has a base 1 mounted on wheels 2, supports 3, top 4 rigid with supports 3, and base 1, bracket 5 and supports 6 and 7. Top 4 and bracket 5 have aligned apertures 8 and 9. Supports 6 and 7 have aligned apertures in which shaft 10 is rotatable. Crank arm 11 is suitably affixed to shaft 10 and carries handle 12. Rigid with shaft 10 is gear 13 meshing with gear 14. Also rigid with shaft 10 is gear 15 meshing with gear 16 which is threaded to rotate about a threaded plunger shaft 17. It is apparent that turning handle 12 rotates gear 13 and gear 14, which is operatively connected with a measuring device 18. Turning handle 12 also rotates gears 15 and 16 and by reason of the threaded relationship to gear 16 which is limited in its movement by bracket 5 and top 4, the plunger shaft 17 is raised or lowered. Plunger shaft 17 has a slot 23 in which is slidable a key, not shown, integral with bracket 5 for preventing rotation. Rigidly connected to the plunger shaft 17 is a plunger 19 provided with a screw threaded aperture 20 for the reception of the end of a hose 21. Plunger 19 fits closely within and is movable within a pail 22 of standard dimensions.

It is seen therefore that rotating handle 12 operates to raise or lower plunger 19 which is in contact with grease contained within pail 22. This causes an ejection of the fluid thru hose 21. The amount ejected is indicated by the measuring device 18. The relationship of the parts is such that considerable force is transmitted to the grease. Ejection occurs even with the most viscous fluids, as aperture 20 is located at the point of immediate pressure. It will be noted that this construction calls for no modification of pail 22 except that it be of proper horizontal dimensions to receive plunger 19. Again the flow of fluid is continuous and uninterrupted.

It is to be noted that the top 4 is rigidly carried by the standards 3, and that the standards are so spaced as to permit the free sliding therebetween of a standard grease pail or container. Further, it is to be noted that the top is spaced upwardly from the bottom a sufficient distance to permit the plunger to be raised clear of the top of the grease pail so that it may be slid laterally from the machine without dismantling any portion of the machine.

I claim as my invention:—

A device for cooperating with standard grease pails comprising a base, a top spaced upwardly therefrom, a pair of spaced standards rigidly joining the top and base, a nut revolubly carried by the top and having a bevel gear thereon, a bevel pinion meshing with said bevel gear, a horizontal shaft provided with a crank for operating said bevel pinion, a plunger rod slidably splined in said top and externally threaded and cooperating with said nut, a plunger carried by the lower end of said plunger rod and adapted to fit the interior of the pail, said plunger having an aperture therethrough, a flexible hose connected to said plunger and communicating with said aperture, said top being spaced upwardly above the top of the pail a sufficient distance to permit the plunger to be raised clear of the pail, whereby the pail may be slid laterally from the device without dismantling any portion of the device.

In testimony that I claim the foregoing I have hereunto set my hand at Milwaukee, in the county of Milwaukee and State of Wisconsin.

EDGAR A. BIENENSTOK.